United States Patent [19]
Weischedel

[11] 3,859,519
[45] Jan. 7, 1975

[54] WIDE DYNAMIC RANGE OMNIDIRECTIONAL OPTICAL SENSOR FOR DETECTING NUCLEAR DETONATIONS

[75] Inventor: Richard C. Weischedel, Camillus, N.Y.

[73] Assignee: General Electric Company, New York, N.Y.

[22] Filed: Apr. 3, 1973

[21] Appl. No.: 347,611

[52] U.S. Cl. ................ 250/206, 250/336, 250/338, 250/349
[51] Int. Cl. ........................... G01j 1/16, G01t 1/16
[58] Field of Search .......... 250/206, 555, 556, 336, 250/338, 349

[56] References Cited
UNITED STATES PATENTS

| | | | |
|---|---|---|---|
| 2,804,574 | 8/1957 | Kingsbury | 250/206 X |
| 3,147,380 | 9/1964 | Buckingham, et al. | 250/338 |
| 3,428,814 | 2/1969 | Doonan | 250/214 |

*Primary Examiner*—Archie R. Borchelt
*Assistant Examiner*—T. N. Grigsby
*Attorney, Agent, or Firm*—Carl W. Baker; Frank L. Neuhauser; Richard V. Lang

[57] ABSTRACT

An optical sensor including a photosensitive device and a linear network and a logging network connected in series with the photosensitive device and with a potential source so that the photosensitive device will operate in the voltaic mode under conditions of low light and will operate in the photo current mode under conditions of high ambient light to produce a wide dynamic range of sensing of light flashes. The sensor units are particularly adaptable to the ganging of plural sensors with amplifiers to permit the arrangement of the photosensitive devices of the sensors for omnidirectional operation.

1 Claim, 2 Drawing Figures

Patented Jan. 7, 1975  3,859,519

SENSOR A | BUFFER AMPLIFIER A | BUFFER AMPLIFIER B | SENSOR B

WIDE DYNAMIC RANGE OMNIDIRECTIONAL OPTICAL SENSOR FOR DETECTING NUCLEAR DETONATIONS

BACKGROUND OF THE INVENTION

1. Field of the Invention

The invention relates to the art of the detection of nuclear events or other light flashes. In the case of nuclear events, it is possible to measure the intensity of the event itself by measurement of time between the occurrence of the first thermal and the second thermal flashes. For this purpose devices are needed which are capable of detecting and reporting the flashes caused by the thermals. These devices can be either directional or omnidirectional. For the purposes of around the clock area monitoring they should also be capable of operating under all light conditions.

2. Prior Art

Optical sensors have been made for many purposes. Some have been designed and used for detecting nuclear events and normally employ silicon voltaic cells which are operated in either the voltaic mode or the photo current mode. In the voltaic mode the output of the cell is a function of the logarithm of the current intensity which provides a fairly wide dynamic range except for the fact that the sensitivity is poor under high ambient light conditions. In the voltaic mode of operation the photosensitive device can operate at a threshold level on the order of magnitude of the ambient conditions which causes the device in the voltaic mode to be fairly sensitive under conditions of low ambient light. However, under high ambient light conditions, as for example bright sun, such devices are insensitive to flashes less than the order of magnitude of the ambient light which might be 100 milliwatts per square centimeter intensity.

If the photosensitive device is operated in the photo current or leakage mode of operation it produces an output which is linear with light intensity. This provides good sensitivity under conditions of high ambient light but results in poor sensitivity in low light levels and therefore has a limited dynamic range.

The prior art does not provide for an optical sensor for the detection and recording of nuclear events which will work in the sunlight which might have an intensity on the order of 100 mw/cm² as well as working under low light conditions without producing false alarms or potential saturation problems.

SUMMARY OF THE INVENTION

The principal object of this invention is to provide an optical sensor which will operate over a wide range of ambient light conditions so that it may be used as a sensor of for example the light generated by a nuclear event under the full range of light conditions from bright sunlight to dark. This result can be accomplished by joining the desirable characteristics of the voltaic mode (logarithmic) and photo current mode (linear) of operation of a photosensitive device. One possible implementation is by providing a variable load resistance for a sensor to cause the sensor to operate in the logarithmic mode under conditions of low level ambient light and to operate in the linear current mode at high ambient levels.

Briefly in accordance with the invention a sensing unit is formed with a photosensitive device placed in the photo current mode in series with an electronic circuit comprising logarithmic and linear networks. The potential across the logarithmic and linear networks will be the sum of the potential across each. The output of each sensing unit is a.c. coupled to an operational half-wave buffer amplifier. The outputs and feedback paths of the buffer amplifier are connected so that only the higher peak output is obtained. With the photosensitive devices connected in series with both a linear resistance and circuitry producing a logarithmic function, the sensing unit has a sensitivity inversely proportional to the ambient light at low light ambient levels and has a fixed sensitivity at high ambient light levels. The output of the sensing unit is then subjected to processing to limit the ultimate output to only the highest amplitude signal.

DESCRIPTION OF THE PREFERRED EMBODIMENT

Figure 1:
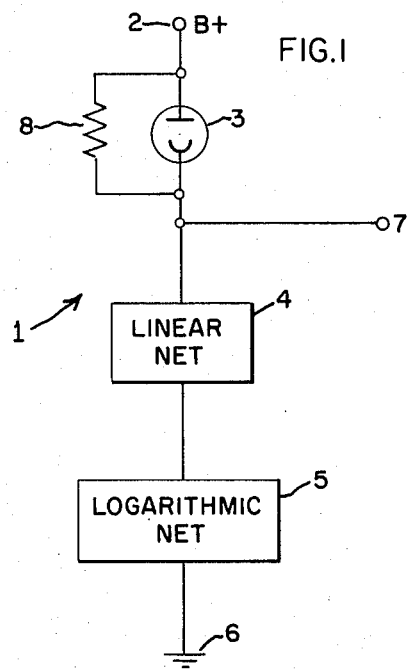
FIG. 1 is a sensing unit in accordance with the invention.
Figure 2:
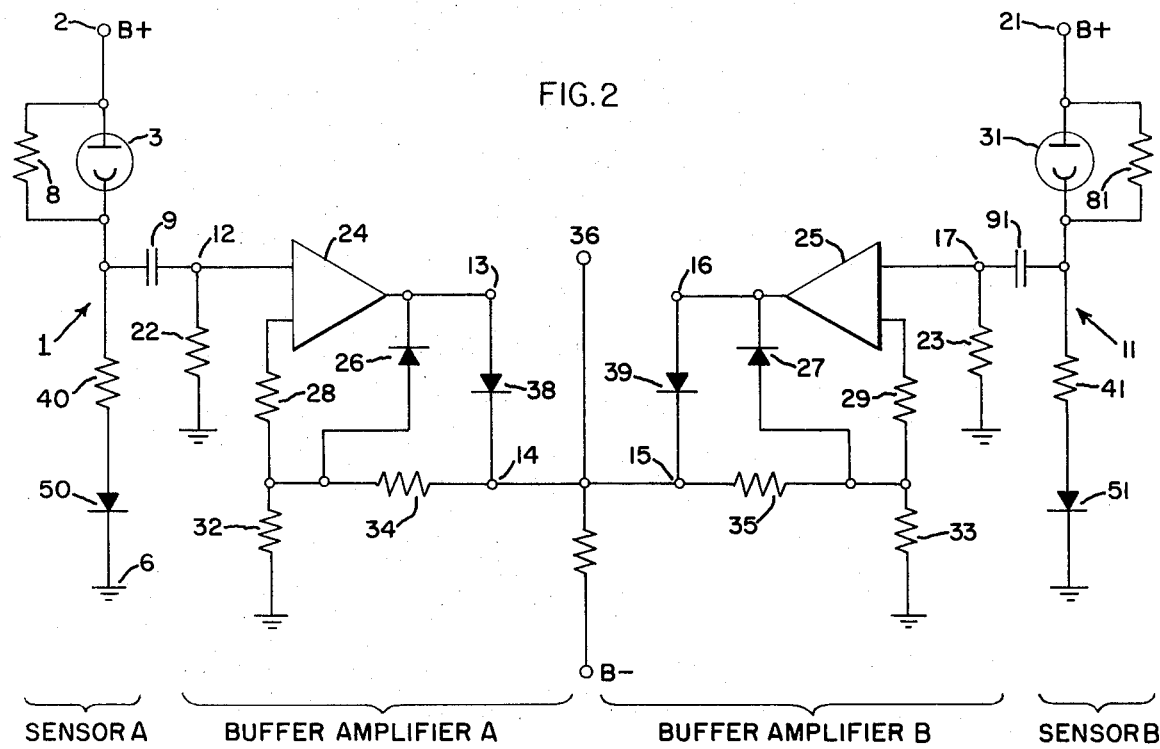
FIG. 2 is a schematic diagram of a two-unit omnidirectional optical sensor.

The embodiment of the invention as shown in schematic diagram in FIG. 1 comprises a single sensing unit 1 including a terminal 2 for application of a potential, photosensitive device 3, a linear network 4, a logarithmic network 5, and a ground 6, all connected in series. When a potential such as the B+ indicated is applied to the circuit, the photosensitive device 3 is operated in the reverse bias leakage condition, i.e., the photo current mode, wherein the photo current $I$ produced is directly proportional to the incident light intensity. The photo current from the device is applied to the linear and logarithmic networks in series as shown in FIG. 1. An output taken at terminal 7 is the sum of the individual potential drops across the two networks. The linear network 4 is principally resistive, and will cause a potential drop over the net of $V = IR$. The logarithmic network is designed so that the potential drop across the net is according to $V = \log I$. With the photosensitive device 3 conducting and a current flowing in the sensing unit circuit, the potential at any time at terminal 7 can be described as $V = IR + K \log I$ where K represents the characteristics of the electronic components used in the logging net. In FIG. 2 this same sensing unit circuit arrangement is used as both sensor A and sensor B in which both linear network and the logarithmic network have been reduced to their most simple forms of a resistor 40 and a silicon diode 50, although any appropriate electronic components producing the same result could be used.

With more specific reference to FIG. 2, the sensing unit can be used in combination with a device such as the buffer amplifier A to limit the output to that produced by changes in light incident on the photosensitive device which deviate from the ambient light level. As also shown in FIG. 2 multiple sensors can be combined as desired to build an omnidirectional device in spite of the fact that the individual photosensitive devices used may have quite directional characteristics.

In the implementation of FIG. 2, sensors A and B are identical and amplifiers A and B are identical and are connected to a common output terminal 36. Each buffer amplifier which is a.c. connected to the sensing unit by means of capacitor 9, 91 includes a grounded resistor 22, 23, an operational amplifier 24, 25 and a feedback circuit including resistances 28, 29 and diodes 26, 27 which with resistors 32, 33 and 34, 35 provide a nonlinear network. Since the operational amplifier 24 is connected between capacitor 9 and resistor 22 which provide for a decay time longer than the signal of interest which is on the order of 10–20 seconds, the amplifier sees only changes occurring in the photo current in the sensing unit. This method of connecting the amplifier to the sensing unit removes from further consideration the photo current resulting from the ambient light level and therefore causes the output of the amplifier as delivered to terminal 36 to be dependent upon optical events or other light deviations rather than on steady state conditions. Diodes 38, 39 are used to permit the coupling of a plurality of sensing unit and buffer combinations to a common output such as terminal 36. Use of these diodes 38, 39 which provide a low impedance for positive loads (forward bias) and high impedance for negative loads (reverse bias) permit only the higher amplitude signals with their positive loads to be transmitted to the output terminal.

Not only does this arrangement solve the problem of attaining the desirable sensitivity in any level of background light but it provides a system in which the sensitivities can be controlled. The voltage drop across the silicon diode 50 or similar logging network 5 is basically the log of the current ($V = \log I$) and increases approximately 45 millivolts for each 100 percent increase in diode current. Of course this is significant only in establishing the sensitivity under low light level conditions because of the a.c. coupling of the sensor to the buffer amplifier. The sensitivity itself of the logging network can be controlled so as to avoid false alarms by light flashes less than that desired to be reported by maintaining a d.c. bias through the diode. A d.c. bias through the diode may be maintained at any threshold level by means of an arrangement such as the resistance 8 in parallel with the photosensitive device 3 to give an equivalent of a minimum light level sensing. The resistance for the linear network 4 or resistor 40 is chosen so that at low light levels the voltage across it is insignificant, i.e. much less than 45 millivolts or some other desired level which is coordinated with the value of resistor 8.

As an additional example, consider the situation in which the selected photosensitive device 3 were a photocell providing 10 milliamperes of photo current at 100 milliwatts per square centimeter light intensity — an intensity exemplary of sun intensity on a clear day. Since the photo current is linear with light intensity the output would be 1 ma for each 10 mw/cm² increase in light intensity. If resistance 40 is 45 ohms, then 45 millivolts output will be received (at output 7 in FIG. 1 or at capacitor 9 in FIG. 2) with each incremental increase of 10 mw/cm². Therefore for increases in light of less quantity than 10 mw/cm², the voltage across resistance 40 will be low (i.e., less than 45 mv). For 100 percent light increases below that same level of 10 mw/cm² the voltage across logging network will be 45 mv. For example, as light would increase from 0.1 mw/cm² ambient to 0.2 mw/cm², the voltage change $\Delta V$ across resistance 40 and the diode forward voltage drop change $\Delta 1/F$ would be 0.5 and 45 mv respectively. The following table shows this over the dynamic range of 0.1 mw (night time) to over 200 mw/cm² (twice full sun intensity). Therefore the following table shows that the sensitivity varies inversely with ambient light at low light levels and is fixed at high light levels:

| AMBIENT LIGHT mw/cm² | VALID* SIGNAL INTENSITY REQUIRED mw/cm² | OUTPUTS VOLTAIC MODE $V_s$ | (mv) PHOTO-CURRENT MODE $R_4 = 45\Omega$ $V_4$ | SENSOR 1 $V_4 + V_s$ | COMMENTS |
| --- | --- | --- | --- | --- | --- |
| .1 | .1 | 45 | 0.45 | 45.45 | Voltaic $V_s$ |
| .2 | .2 | 45 | 0.90 | 45.90 | Sensitivity |
| .4 | .4 | 45 | 1.80 | 46.80 | Range varies |
| .8 | .8 | 45 | 3.60 | 48.60 | inversely with |
|  | .9 | 41 | 4.05 | 45.05 | ambient light. |
| 2 | 1.7 | 40 | 7.65 | 47.65 |  |
| 4 | 3 | 35 | 13.5 | 48.5 | Both voltaic |
| 8 | 5 | 25 | 22.5 | 47.5 | and photo- |
| 10 | 5.5 | 21 | 24.7 | 45.7 | current |
| 20 | 7 | 18 | 31.5 | 49.5 | sensitivity. |
| 40 | 8 | 10 | 36 | 46 | Photocurrent |
| 80 | 10 | 5 | 45 | 50 | Range Fixed |
| 100 | 10 | <5 | 45 | 45+ | Sensitivity |
| 150 | 10 | <5 | 45 | 45+ |  |
| 200 | 10 | <5 | 45 | 45+ |  |

*Valid signal is defined as one which produces 45 to 50 millivolt output.

As already indicated the operational amplifier 24 has its noninverting input attached between the capacitor and the grounded resistor 22 and sees only the varying d.c. potential appearing the the sensing circuit. Any change in level of potential applied to capacitor 9 is amplified by the non-inverting amplifier 24 to produce a potential at the input side of diode 38 which is equal to the input voltage times the sum of the resistances of diode 38, resistance 34 and resistance 32 which sum is divided by resistance 32. Noting that the voltage at the input side of diode 38 could also be expressed as equal to the output voltage at the output of the buffer amplifier times the sum of the resistances of the diode 38, resistance 34 and resistance 32, said sum being divided by the sum of resistors 34 and 32, it would appear that the output voltage of the entire system in terms of the input voltage to operational amplifier 24 would be equal to that input voltage times the sum of the resistances of resistors 34 and 32 which quantity is divided by the resistance of resistor 32. This may be algebraically expressed as follows:

$$V_{13} = V_{12} (R_{38} + R_{34} + R_{32})/R_{32};$$
$$V_{13} = V_{14} (R_{38} + R_{32} + R_{34})/R_{34} + R_{32};\text{ and, therefore:}$$
$$V_{14} = V_{12} (R_{32} + R_{34})/R_{32}$$

Where $R$ represents the resistances of a component having the subscript number and wherein the $V$ represents the voltage at the point on FIG. 2 at the subscript number. This demonstrates that the voltage across diode 38 drops out of the gain equation making possible the use of the diodes 38, 39 solely for the purpose of ganging sensing units and buffer amplifiers into an integrated net to produce an omnidirectional system. As previously noted, diodes 38, 39 permit the output at terminal 36 to reflect only the highest amplitude received from the individual sensors. This is demonstrated by noting that if the signal from photosensitive device 3 is higher than that from device 31 the amplifier A will have a higher output at 13 than buffer amplifier B will produce at 16. Under these conditions amplifier 25 output will go negative at 16 to hold its noninverting input equal to the voltage at 17 and the diode 27 will provide a low impedance path for this signal causing a voltage to develop across resistance 35 equal to the ratio of the difference of the photosensitive device outputs. Resistor 35 and diode 29 are both high impedance compared to diode 38 under these conditions since diode 38 is forward biased and diode 39 is back biased. Any number of stages can be used providing the positive output impedance of any amplifier is much lower than the parallel negative load impedances of the remaining amplifiers. Since the resistances of resistors 34 and 35 can be set in the megohm region (i.e., negative load impedance) and the positive load impedance of diodes 38 and 39 can be a few ohms, a large number of stages can be used.

What is claimed as new and desired to be secured by Letters Patent of the United States is:

1. An optical sensor for detecting and signaling the occurrence of a deviation from an ambient light condition comprising:
   a. an electrical photosensitive device;
   b. electrical terminal and ground means for applying a potential across said photosensitive device;
   c. a variable load resistance means in series with said photosensitive device for producing an output signal in terms of the potential across said resistance means which is relatively linear for high current flows and relatively logarithmic for low current flows whereby said device and said resistance means constitutes a detector circuit, said variable load resistance means including:
      1. a linear network of resistance $R$ across which the potential $V$ is according to $V = IR$, in series with
      2. a logarithmic network across which the potential $V$ is according to $V = (f) \log I$, whereby said variable load means output signal is a voltage according to $V = (f) \log I + IR$; and
   d. a resistance in parallel with said photosensitive device for providing a threshold level of current in said detector circuit.

* * * * *